(12) United States Patent
Louch et al.

(10) Patent No.: US 10,884,573 B2
(45) Date of Patent: Jan. 5, 2021

(54) USER INTERFACES FOR MULTIPLE DISPLAYS

(71) Applicant: Apple Inc., Cupertino, CA (US)

(72) Inventors: John O. Louch, Santa Barbara, CA (US); Raymond S. Sepulveda, Campbell, CA (US); Kristin M. Forster, Los Altos Hills, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/905,692

(22) Filed: Jun. 18, 2020

(65) Prior Publication Data

US 2020/0319755 A1 Oct. 8, 2020

Related U.S. Application Data

(63) Continuation of application No. 14/080,587, filed on Nov. 14, 2013, now Pat. No. 9,870,115.
(Continued)

(51) Int. Cl.
*G06F 3/0481* (2013.01)
*G06F 3/14* (2006.01)
(Continued)

(52) U.S. Cl.
CPC .......... *G06F 3/0481* (2013.01); *G06F 3/0482* (2013.01); *G06F 3/0486* (2013.01);
(Continued)

(58) Field of Classification Search
CPC ..... G06F 3/0481; G06F 3/0482; G06F 3/0484
See application file for complete search history.

(56) References Cited

U.S. PATENT DOCUMENTS 5,923,307 A * 7/1999 Hogle, IV ........... G06F 3/04897
345/1.3
6,018,340 A * 1/2000 Butler ..................... G06F 3/038
345/156
(Continued)

FOREIGN PATENT DOCUMENTS

EP 2674834 A2 12/2013
KR 10-2012-0092037 A 8/2012
(Continued)

OTHER PUBLICATIONS

International Search Report and Written Opinion for PCT/US2014/038104, dated Sep. 30, 2014.

*Primary Examiner* — Anil K Bhargava
(74) *Attorney, Agent, or Firm* — Fernando & Partners, LLP

(57) ABSTRACT

A set of user interfaces for a data processing system that operates with two or more display devices coupled to the system. In one embodiment, in response to moving a first window between two displays, the first window is displayed, as it straddles the two displays, differently on the two displays. For example, while a reference point (e.g. a cursor) on the window remains on a first display, a first portion of the window on the first display is displayed normally while a second portion on the second display is displayed with more translucence (more transparency) than the first portion; when the references point crosses to the second display, the first portion becomes more translucent than the second portion.

27 Claims, 19 Drawing Sheets

Related U.S. Application Data

(60) Provisional application No. 61/832,372, filed on Jun. 7, 2013.

(51) Int. Cl.

| | | |
|---|---|---|
| *G09G 5/14* | (2006.01) | |
| *G06F 3/0488* | (2013.01) | |
| *G06F 3/0486* | (2013.01) | |
| *G06F 3/0482* | (2013.01) | |
| *G06F 3/0484* | (2013.01) | |

(52) U.S. Cl.
CPC ........ *G06F 3/0488* (2013.01); *G06F 3/04817* (2013.01); *G06F 3/04842* (2013.01); *G06F 3/1423* (2013.01); *G06F 3/1431* (2013.01); *G06F 3/1446* (2013.01); *G09G 5/14* (2013.01); *G09G 2300/026* (2013.01); *G09G 2320/0233* (2013.01); *G09G 2320/0242* (2013.01)

(56) References Cited

U.S. PATENT DOCUMENTS

| | | | |
|---|---|---|---|
| 6,211,879 B1* | 4/2001 | Soohoo | G06F 3/0481 715/785 |
| 6,542,148 B1* | 4/2003 | Tanaka | G06F 3/04812 345/1.1 |
| 6,573,913 B1 | 6/2003 | Butler et al. | |
| 8,416,346 B2 | 4/2013 | Bae et al. | |
| 2002/0059514 A1* | 5/2002 | Hendry | G09G 5/006 713/100 |
| 2006/0123353 A1* | 6/2006 | Matthews | G06F 3/0482 715/779 |
| 2006/0136828 A1* | 6/2006 | Asano | G06F 9/54 715/733 |
| 2009/0027302 A1* | 1/2009 | Li | G09G 5/14 345/1.1 |
| 2009/0309808 A1* | 12/2009 | Swingler | G06F 3/1423 345/1.3 |
| 2011/0063191 A1* | 3/2011 | Leung | G06F 3/1423 345/1.1 |
| 2011/0115688 A1 | 5/2011 | Yu | |
| 2011/0181496 A1* | 7/2011 | Lanier | G06F 3/1438 345/2.2 |
| 2011/0209058 A1* | 8/2011 | Hinckley | G06F 3/04883 715/702 |
| 2011/0292081 A1 | 12/2011 | Matsunobu | |
| 2012/0056817 A1* | 3/2012 | Griffin | G06F 3/0482 345/173 |
| 2012/0072867 A1* | 3/2012 | Schlegel | G06F 3/0481 715/808 |
| 2013/0057572 A1* | 3/2013 | Anderson | G06F 9/451 345/619 |
| 2013/0086493 A1 | 4/2013 | Reeves et al. | |
| 2013/0086508 A1* | 4/2013 | Oguz | G06F 3/04883 715/779 |
| 2014/0101574 A1* | 4/2014 | Maynard | G06F 3/1423 715/761 |

FOREIGN PATENT DOCUMENTS

| | | |
|---|---|---|
| WO | 2009086631 A1 | 7/2009 |
| WO | 2011090951 A1 | 7/2011 |

\* cited by examiner

USER INTERFACES FOR MULTIPLE DISPLAYS

CROSS REFERENCE TO RELATED APPLICATIONS

This application claims the benefit of U.S. Provisional Application No. 61/832,372, filed on Jun. 7, 2013, U.S. Non-Provisional application Ser. No. 14/080,587, filed Nov. 14, 2013, and U.S. Non-Provisional application Ser. No. 15/865,614 filed Jan. 9, 2018, which are hereby incorporated by reference in their entireties.

BACKGROUND

Presently, a user of a data processing system, such as a desktop computer or a laptop computer, can use multiple display devices concurrently as the output devices from the data processing system, such as a single desktop computer or a laptop computer. The use of multiple displays allows for a greater display space allowing the user to display more windows or larger windows, etc. Currently, on the Macintosh operating system OS X, two or more display devices, such as liquid crystal displays or plasma displays or CRT displays can be driven by one or more display controllers on a data processing system. Currently in OS X, the dock, which is a form of an application control region, exists on a primary display and a system wide menu bar exists also on the primary display while any other displays will not include the dock and will not have a menu bar. The other displays can present a background image which is part of a desktop as is known in the art. A user can move a window from one display to another display and vice versa, and in doing so the window will appear to move across the displays. When a window straddles between two displays, it appears the same on both displays (ignoring any effect caused by a mismatch in display settings or display characteristics which can cause differences in color or luminance as a result of the mismatch between the displays).

SUMMARY OF THE DESCRIPTION

According to one aspect of the embodiments described herein, a data processing system with two or more display devices allows a user to move a window between two display devices, and when the window straddles across or between the two display devices, the window can appear differently on the two different display devices. This difference is due to an intentional change in appearance and is not due to a difference between the displays or display settings. A first display device can include a first graphical user interface and a second display device can include a second graphical user interface. The first graphical user interface is displayed in a first display region defined by a border of the first display device and the second graphical user interface is displayed in a second display region defined by a border of the second display device. One or more windows can exist on each display device, and a user can select one of those windows and apply an input associated with the window, and the input can indicate a movement of the first window from, for example, the first display region to the second display region. In one embodiment, windows can be moved in either direction. In response to the input indicating a movement, the data processing system determines a manner of displaying a window which straddles both display regions, such as when it is displayed in both the first region and the second display region. The manner of displaying the first window while it straddles both display regions can be one of: (a) displaying a first portion of the first window that is within a first display region in a normal appearance mode and displaying a second portion of the first window that is within the second display region in a different appearance mode that appears differently than the normal appearance mode while a reference point which is associated with the first window remains within the first display region. In one embodiment, the reference point can be a cursor which has been associated with the window, such as when the cursor is used in a drag and drop operation in which the first window is dragged from the first display region to the second display region. When the reference point is within the second display region, the system displays the first portion of the first window that is within the first display region in the different appearance mode and displays the second portion of the first window which is in the second display region in the normal appearance mode. In one embodiment, the normal appearance mode can be the appearance of the window when it is displayed entirely in only one of the two display regions, and the different appearance mode can be an appearance in which the window is more translucent (e.g., more transparent) than the window in its normal appearance mode. Other differences in appearance can be utilized in addition to or rather than transparency or translucency. For example, a difference in color schemes can be used to show the two different portions of the windows; alternatively, the second portion of the window which does not include the reference point can be dimmer or can include stripes or can have a gradient transparency effect, etc. In one embodiment, the reference point can be one of a cursor location or a touch input location or part of the first window, such as a midway point of the first window.

Another aspect of the embodiments described herein relates to the manner in which the same or different menu bars can be displayed concurrently but differently on two or more display devices. In one embodiment, a menu bar can be presented along a border of a display device and can present selectable options in the menu bar which, in response to selecting one of the options causes the presentation of selectable commands in one or more menus associated with the menu bar. In one embodiment, the menu bar can present pull down (or pop up) menus in response to selections within the menu bar, and each pull down menu includes selectable commands of a particular application which is presenting one or more front most windows in a display region which includes the menu bar. In one embodiment, the menu bar is separate from any windows of the application, and the menu bar is displayed on a first display device while the same menu bar is displayed, with a difference appearance, on a second display device. The difference in appearance between the same menu bar can be achieved by making one menu bar more translucent or dimmer or grayed out or by implementing other variations in appearance.

In one embodiment, one menu bar will appear in a normal appearance mode while the other menu bar on a display which does not have cursor focus appears more translucently such that a background image will be more visible through the more translucent menu bar than the menu bar which is displayed with the normal appearance mode on the other display device. In one embodiment, the appearance of the two menu bars on the two different display devices can be changed in response to a change in cursor focus as the cursor focus is moved between the two display devices. For example, if a user moves the cursor from the first display which has the current cursor focus to the second display and causes a change in cursor focus (such as, for example, selecting an icon or a window or some other object displayed on the second display device), then the appearance of the menu bars on the two devices will change such that the menu bar on the second display device which has now received cursor focus now appears normally while the menu bar on the other display device appears differently than the menu bar on the display device which has the current cursor focus.

Another aspect of the embodiments described herein relates to how an application control region, such as a dock, can be moved between two display devices. In one embodiment, an application control region can be displayed on a border of the first display device, the border of the first display device defining a first display region. A command can then be received to remove the application control region from the first display region and to display, in response to the command, the application control region on the border of the second display device in response to the command. In one embodiment, the command can include one of: (a) a cursor movement or positioning of the cursor near a predetermined displayed area, such as, for example, a border of the second display region; (b) a touch gesture near a predetermined displayed area, such as, for example, the border of the second display region; and (c) an activation (e.g., clicking) of a button of a pointing device (e.g., mouse) within a predetermined displayed area (e.g., near the border of the second display region), which can be user configurable. In one embodiment, the command to remove the application control region from the first display region can include receiving an input, from a cursor control device, that indicates a movement of the cursor towards and beyond a border of the second display device. For example, if the cursor control device is a mouse, the user can move the cursor towards the border by, for example, pushing the mouse in a certain direction until the cursor reaches the border and then continuing to push the mouse in the same direction to indicate the movement beyond the border (e.g. outside of the display region of) the second display device.

Other features and embodiments are described further below. It will be understood that one or more of these embodiments may be implemented in a variety of data processing systems, such as general purpose computers, hand held computers which can drive multiple displays, embedded systems, smart phones which can drive multiple displays and other consumer electronic devices. It will also be understood that one or more of the embodiments described herein may be implemented in software which is stored on a computer readable or machine readable non-transitory storage medium which will cause a data processing system to perform one or more of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Various user interfaces are described which can be used with a data processing system that operates with two or more display devices coupled to the data processing system. In each case, the same data processing system drives the two or more display devices to provide any one of the embodiments described herein. While this description focuses on systems which use two display devices, it will be appreciated that the various embodiments can be extended to systems which use more than two display devices. It will also be appreciated that the various embodiments can be mixed together to provide combined embodiments as will be described further below.

Figure 1A:
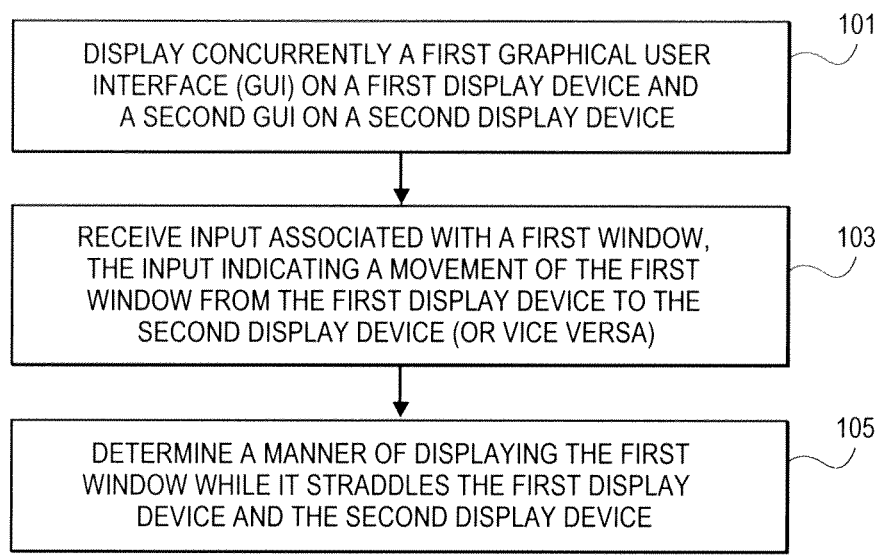
FIG. 1A is a flowchart which illustrates a method according to one embodiment for presenting a window when it straddles between or across two display devices.
Figure 1B:
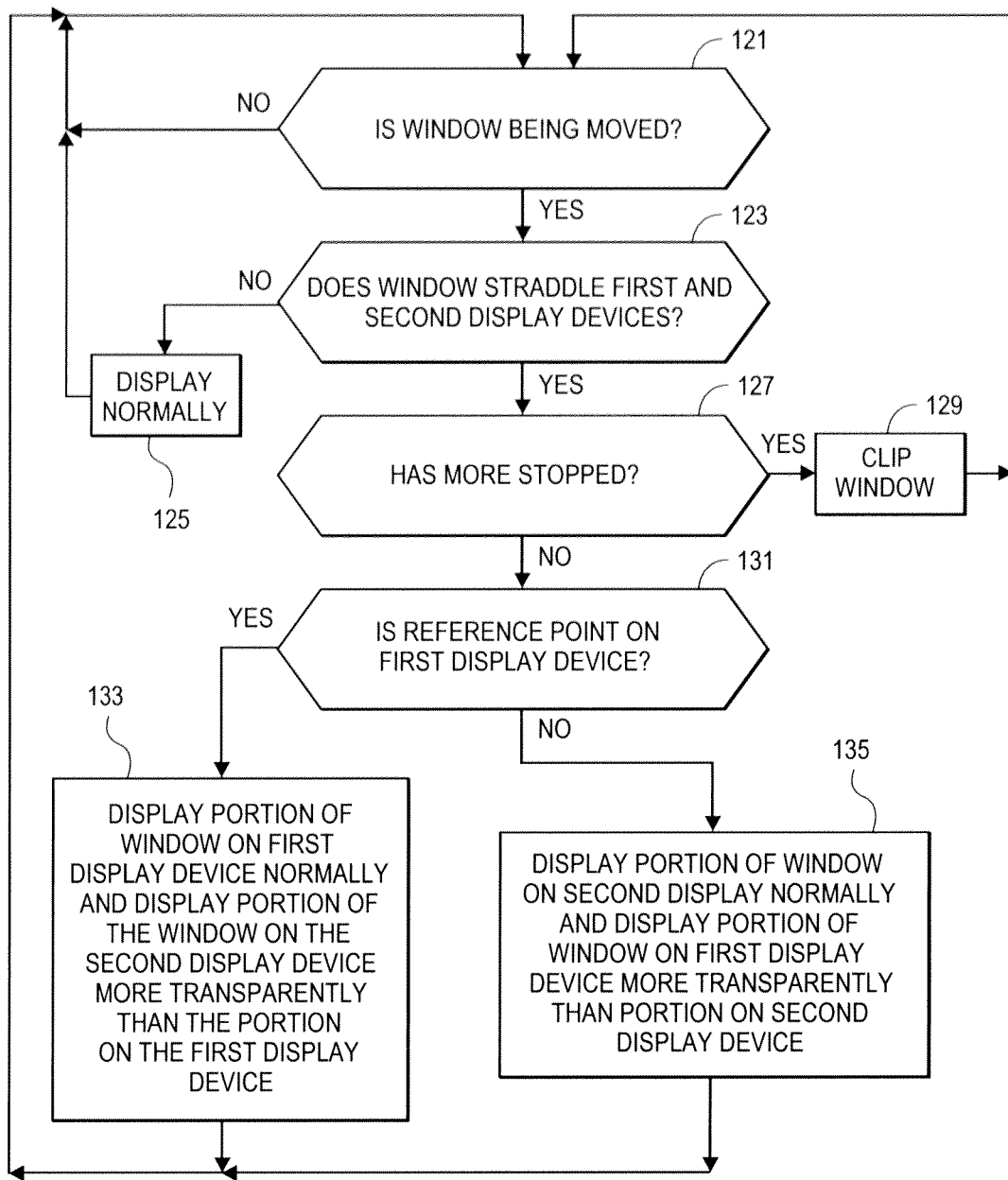
FIG. 1B shows a flowchart indicating an example of a method which can be implemented as part of a method shown in FIG. 1A.

One aspect of various embodiments described herein relates to how the portions of a window which straddle across two display devices are displayed differently on the two display devices. This can occur in response to moving a first window between two displays such that when the window is displayed as it straddles across the two displays, it is displayed differently on the two windows. For example, while a reference point, which can be a cursor position on the window or a point on the window remains on a first display, a first portion of the window on the first display is displayed normally while a second portion of the window on the second display is displayed with more translucence than the first portion. When the reference point on the window crosses to the second display then the first portion becomes more translucent in one embodiment than the second portion which is displayed on the second display. FIGS. 1A and 1B show an example of a method for displaying these two portions of a window differently as the window straddles between two or more displays. FIGS. 2A, 2B, 2C, 2D, 2E, and 2F show an example of a graphical user interface on two displays which illustrate the methods shown in FIGS. 1A and 1B.

Figure 2A:
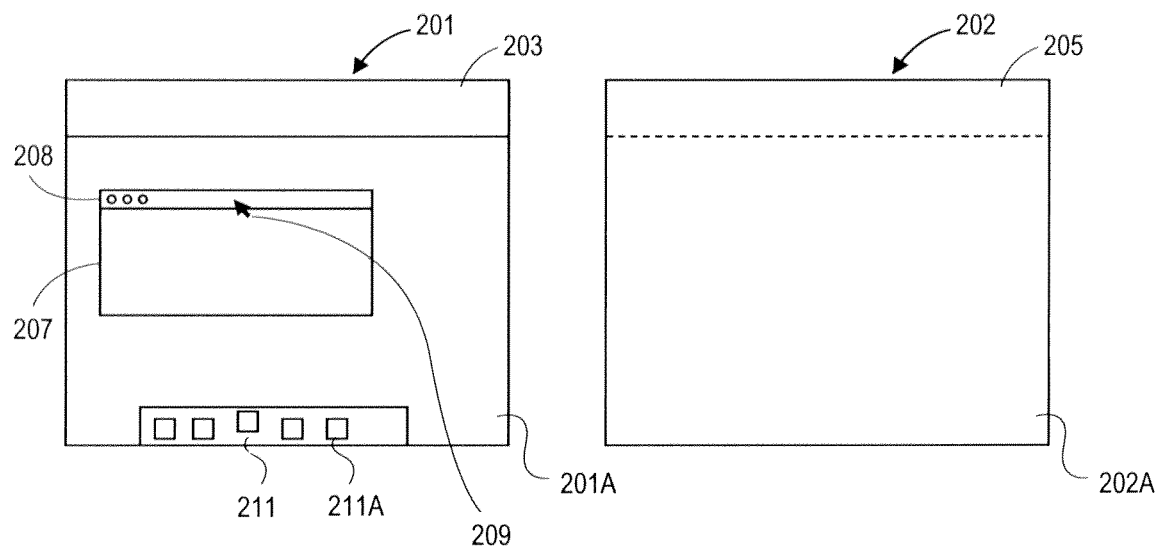
FIGS. 2A, 2B, 2C, 2D, 2E, and 2F show an example of a user interface in which a window that straddles across or between two display devices is displayed differently on the two devices while it straddles across the display devices.

Referring to FIG. 1A, the method can begin in operation 101 in which a first display device displays a first graphical user interface concurrently while a second display device displays a second graphical user interface. Each graphical user interface can be contained within a display region, such as first display region 201A and a second display region 202A shown respectively by the display devices 201 and 202 as shown in FIG. 2A. The graphical user interfaces can include a menu bar, in one embodiment, on both displays or a menu bar only on one display or a menu bar which appears in normal mode on one display and appears differently on the other display. In the example shown in FIG. 2A, menu bar 203 is displayed as a normal menu bar while menu bar 205 is displayed differently as a grayed out or more translucent menu bar that is more translucent than menu bar 203. The graphical user interface shown on the display device 201 also can include an application control region 211 which can, in one embodiment, be similar to the dock which is provided by Macintosh operating system OS X as is known in the art. The application control region 211 can include one or more icons, each representing an application which can be launched or an application which has been launched. Further details in connection with the dock can be found in published U.S. Patent Application US20100313164 which is hereby incorporated herein by reference.

Figure 2B:
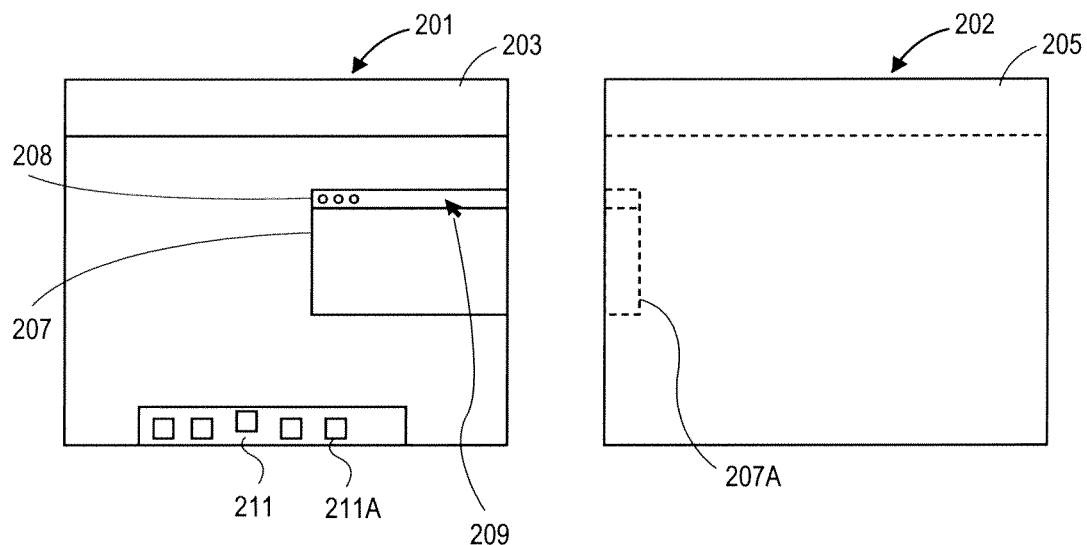

Each display region, such as display region 201A and 202A can include one or more windows, such as window 207 shown in FIG. 2A. Each window can include a title bar, such as title bar 208 which can be used to move the window by positioning a cursor, such as cursor 209 over the title bar and by selecting the title bar by, for example, pressing a button on a mouse or pressing a key on a keyboard or by other techniques known in the art. Positioning cursor 209 over the title bar 208 and pressing a mouse's button or otherwise indicating a selection of the title bar can allow the user to drag the window 207 from the first display device 201 to the second display device 202. It will be appreciated that other types of inputs can be used to indicate a move of a window as is known in the art. Referring back to FIG. 1A, operation 103 illustrates the receipt of the input associated with the first window, such as when the cursor 209 is positioned over the title bar 208 and the window is dragged 207 by depressing the mouse's button while moving the mouse to indicate the movement. The input indicating a movement which is received in operation 103 of FIG. 1A in turn causes the data processing system to move the window on one or both of the display devices. When the window straddles both display devices then operation 105 is performed in which the manner of displaying the first window while it straddles the first display device and the second display device is determined. FIG. 2B shows an example of how the window 207 straddles the two display devices such that a portion 207A of the window 207 is displayed on the second display device 202 while the remainder of the window 207 is displayed on the first display device 201.

Figure 2C:
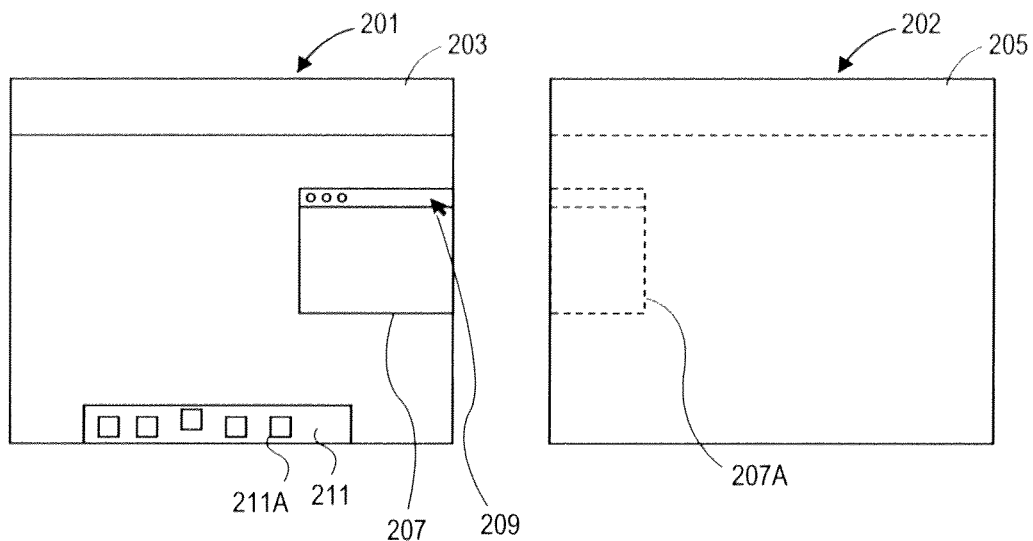
Figure 2D:
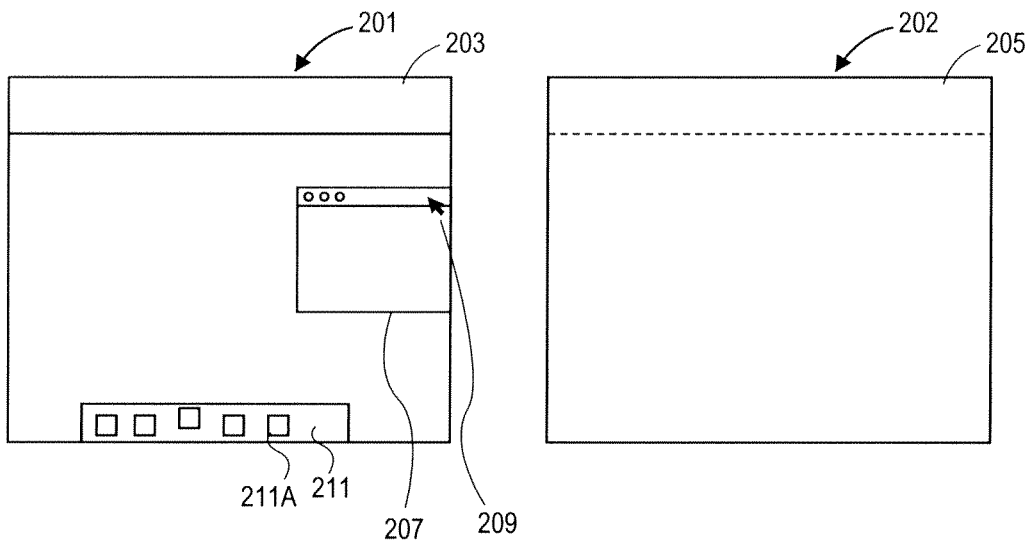
Figure 2E:
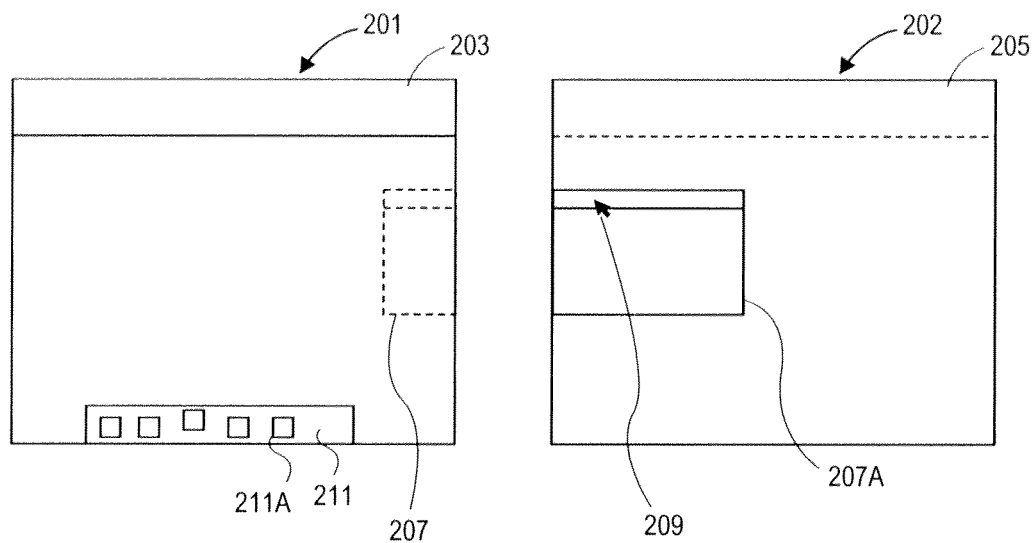
Figure 2F:
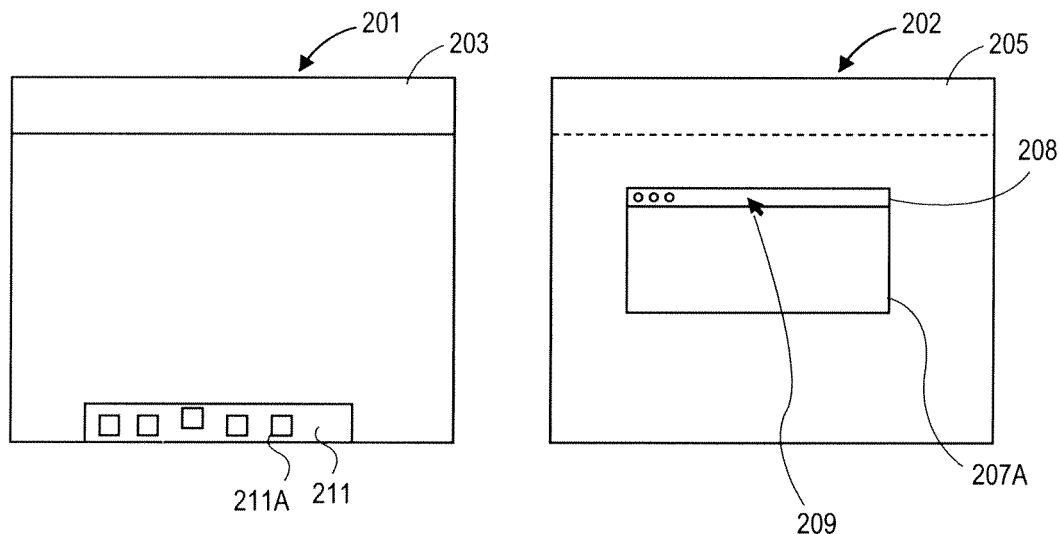
Figure 2G:
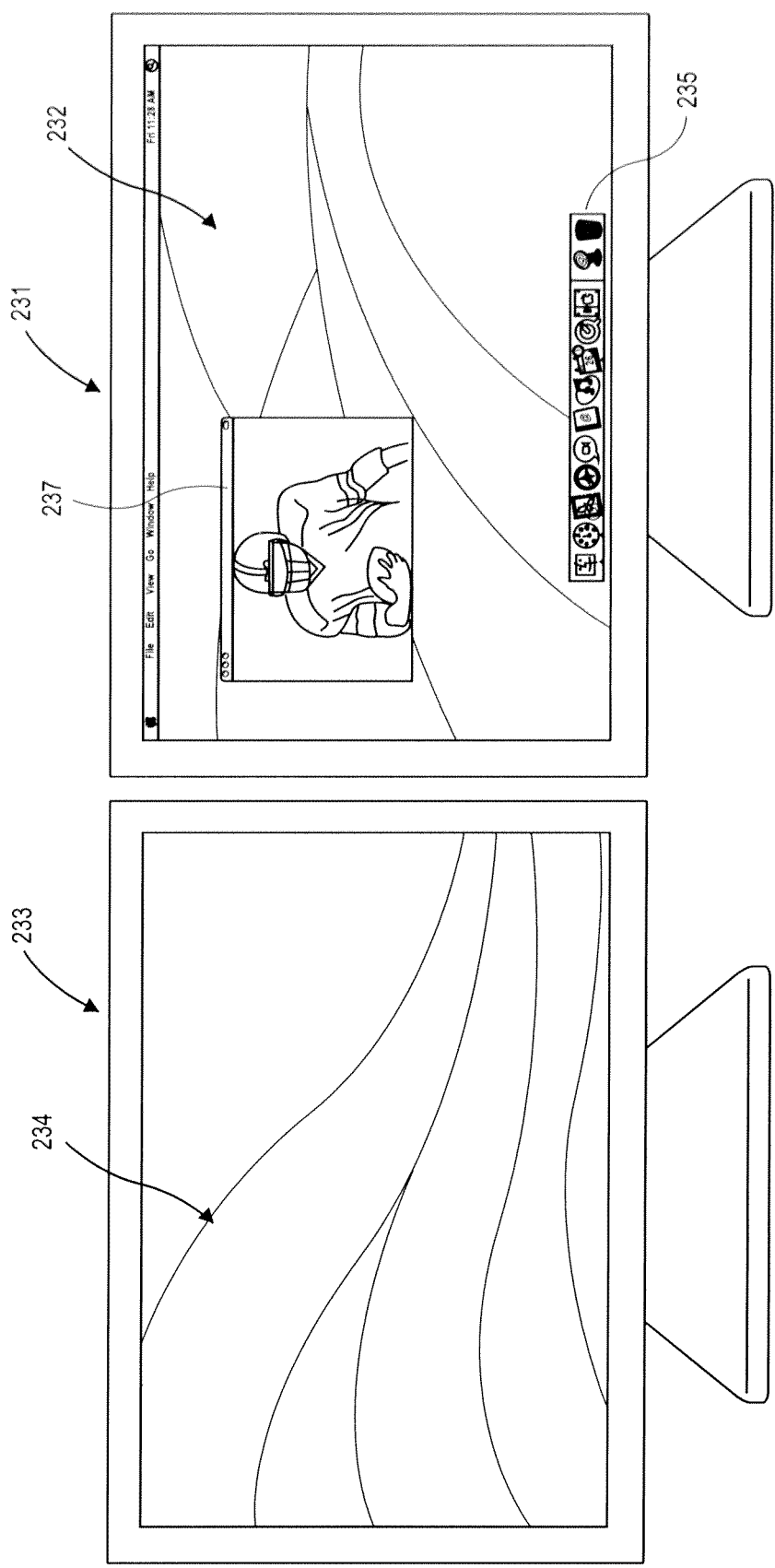
FIGS. 2G, 2H, 2I, and 2J show another example of a graphical user interface in which the appearance of different portions of a window, as it straddles across two display devices, are shown differently.

FIG. 1B provides a more detailed exemplary method for performing operations 103 and 105 of FIG. 1A. In operation 121 of FIG. 1B, the data processing system determines whether or not the window is being moved; if it is not, the system reverts back to checking the status of the window over time to determine whether or not it is being moved. Known techniques for determining when a window is being moved can be used with the embodiments described herein. If the window is being moved, then operation 123 can be performed by determining whether the window straddles the first and the second display devices. If the window does not straddle the two display devices then it is displayed normally in operation 125 which reverts back to operation 121. On the other hand, if the window does straddle the two display devices, then processing proceeds to optional operation 127 in one embodiment. Examples of a window which straddle two display devices are shown in FIGS. 2B, 2C, 2D, and 2E. FIGS. 2A and 2F provide examples of a situation where the window does not straddle the two display devices. In operation 127 the system determines whether or not the move has stopped, in which case the window that straddles the two display devices is clipped such that the portion of the window which does not include the reference point is clipped and thus does not appear on its display device. FIG. 2D shows an example of window 207 which has been clipped such that the portion 207A is not displayed on display device 202 while the other portion which includes the reference point is displayed on display device 201. In the example shown in FIGS. 2A through 2F, the reference point, in this embodiment, is the cursor itself (cursor 209) which is associated with the title bar 208 of window 207.

The reference point can be the cursor itself which is associated with the window or a part of the window, such as a center location of the title bar of the window or a touch input location on the window (e.g., the location on the window which has received a touch input to drag or move the window across a display device).

If operation 127 determines that the move has not stopped, then the system determines the location of the reference point to determine whether or not it is on the first display device. If the reference point is on the first display device then operation 133 is performed in which a portion of the window on the first display device is displayed normally and a portion of the window on the second display device is displayed differently (e.g., more transparently) than the portion of the window on the first display device. FIGS. 2B and 2C show examples in which the portion of the window 207 on the first display device is displayed normally while the portion of the window on the second display device is displayed differently than the portion on the first display device. If operation 131 determines that the reference point is not on the first display, then operation 135 is performed in which the system displays the portion of the window on the second display normally and displays the portion of the window on the first display device more transparently or otherwise differently than the portion of the window on the second display device. Processing operations 133 and 135 are in each case followed by returning to operation 121 in which the movement of the window is monitored. FIG. 2E shows an example of the result of operation 135.

It will be appreciated that there are numerous ways in which the two portions of the window can be displayed differently. In one embodiment, the difference can result from different alpha values used to control the transparency or translucence of each portion. If a window is more translucent, then the background image will appear through the window while the other portion which is not as translucent will not show the background image. In one embodiment, the background image can be another window which is behind the window being moved or a desktop image, etc. In another embodiment, the difference in translucence or transparency can be implemented with a gradient of changing translucence. In another embodiment, the portions of the window can be displayed differently by using different color schemes (e.g., title bars that have different colors, or window frame components having different colors, etc.). In another embodiment, one portion may be displayed dimmer or grayed out relative to the other portion of the window.

In one embodiment, the methods depicted in FIGS. 1A and 1B and also illustrated in FIGS. 2A through 2F can work in reverse. In particular, the sequence starting with FIG. 2A then 2B, 2C, 2D, 2E, and 2F represent one direction in which the user has moved window 207 from the first display 201 to the second display 202 by, for example, dragging the window 207 from the first display device 201 to the second display device 202. The user stopped the move in FIG. 2D by, for example, removing the user's finger from the button on a mouse and then resume the move by keeping the cursor 209 over the title bar 208 and pressing the mouse's button again and beginning the move again to drag the window 207 over to the display device 202 where it is finally deposited and the move is ended as shown in FIG. 2F. The user however can go in reverse beginning with FIG. 2F and drag the window 207A back over towards the first display region 201A defined by the border of the display device 201; in this case, the operation begins with FIG. 2F and the user can proceed in reverse next to FIG. 2E, and then to FIGS. 2D and 2C, and then to FIG. 2B and finally to the user interface shown in FIG. 2A.

While the embodiment shown in FIGS. 2A through 2F show a cursor which can be controlled by a mouse or other cursor control device, it will be appreciated that a touch input system, such as a touch sensitive screen or other touch surfaces (e.g., touch input pad) can be used instead of a mouse. If a touch sensitive system is used, a cursor, such as cursor 209 may be unnecessary or may appear on demand in response to a user's input.

The embodiments illustrated relative to FIG. 1A, 1B, and FIGS. 2A through 2F can also be combined with any one or more of the other embodiments described herein, such as the embodiment relating to an application control region (illustrated in FIGS. 3, 4A-4D) or embodiments relating to differently displaying menu bars, such as the embodiments shown in FIGS. 5, 6A-6D or FIG. 7. For example, the application control region 211 in one embodiment can use a technique to allow it to be removed from the first display device 201 and moved to the second display device 202 as described in connection with FIG. 3. Similarly, menu bars 203 and 205 can exhibit the changing appearance of the menu bars as described relative to FIG. 5 or as described relative to FIG. 7. In another embodiment, display device 202 may not include a menu bar and may merely be a desktop region of the data processing system.

Figure 2H:
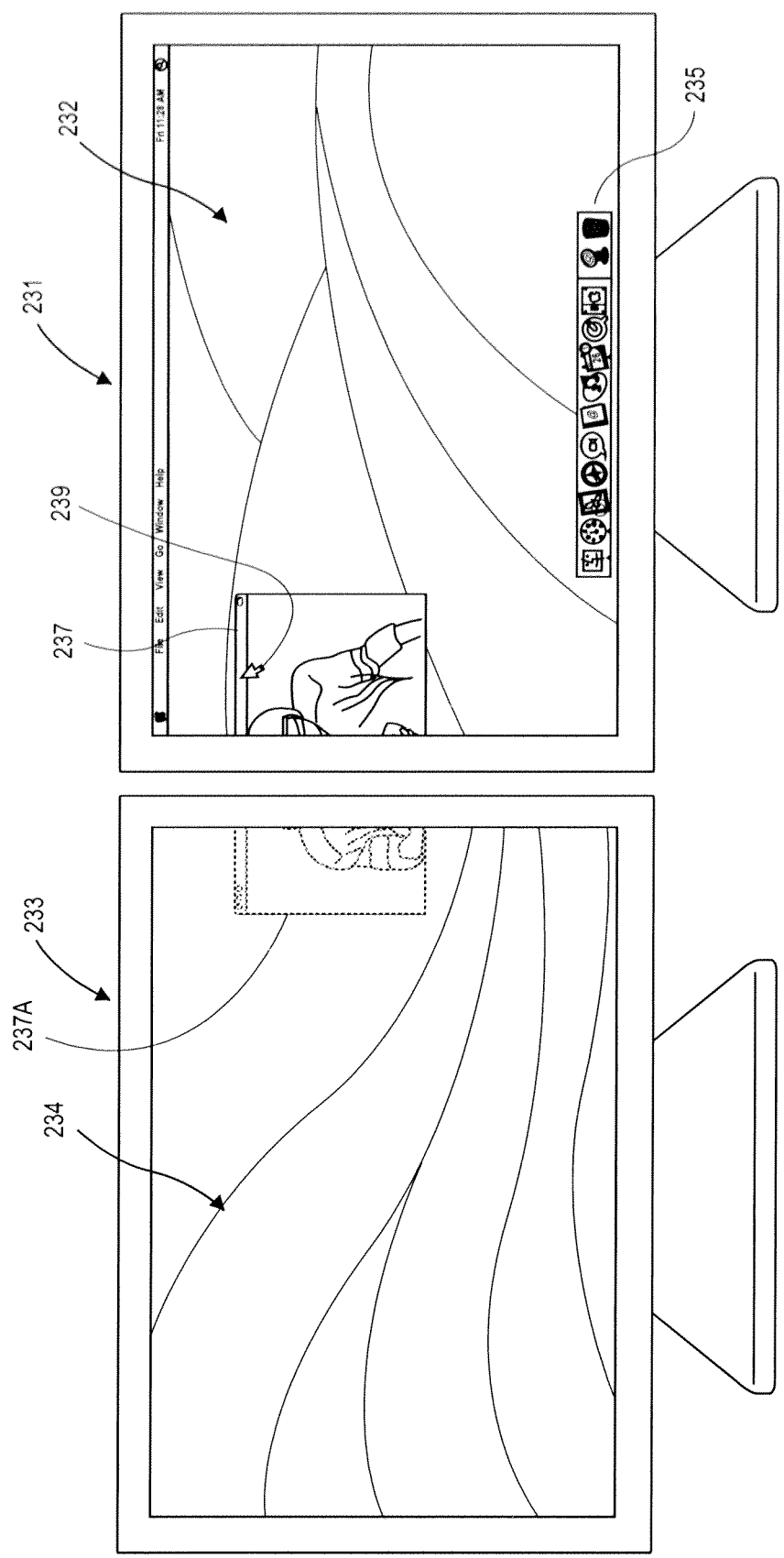
Figure 2I:
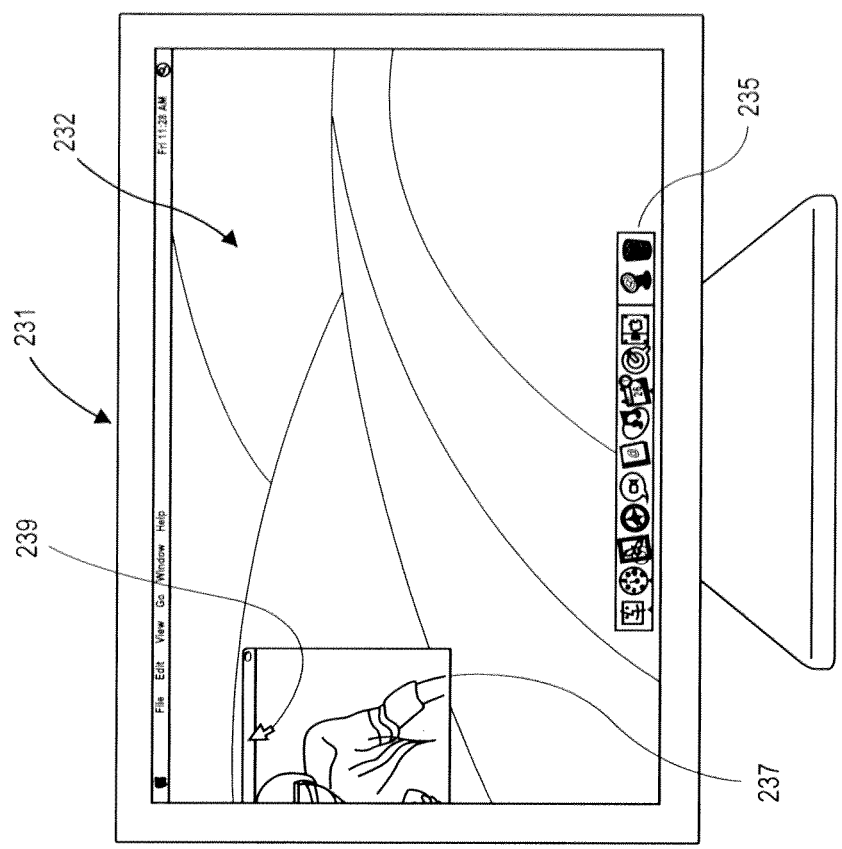
Figure 2I:
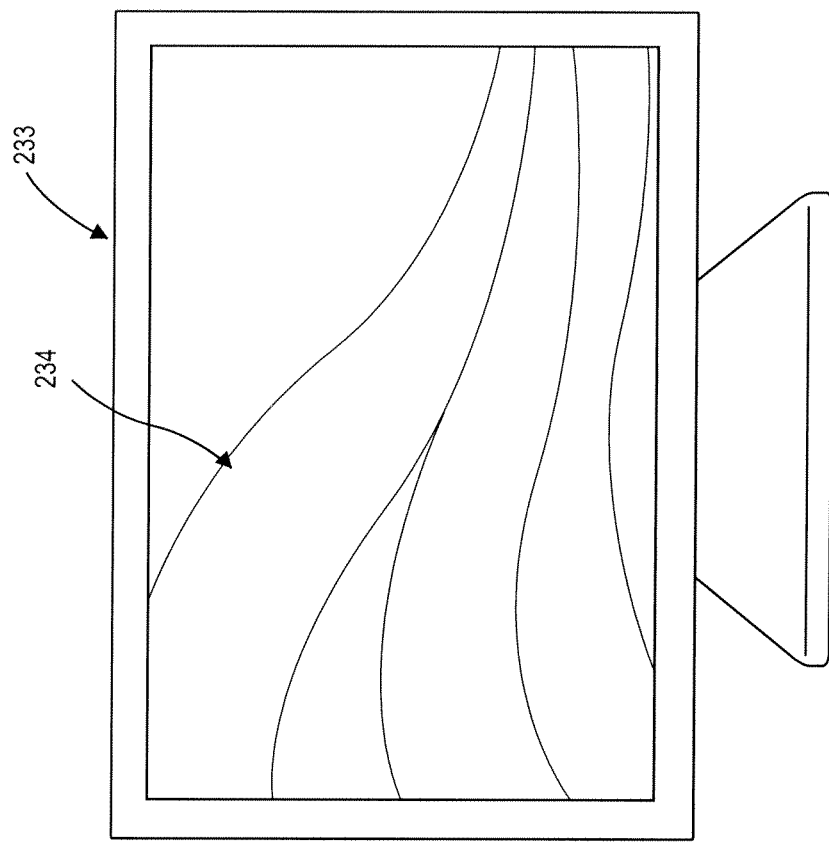
Figure 2J:
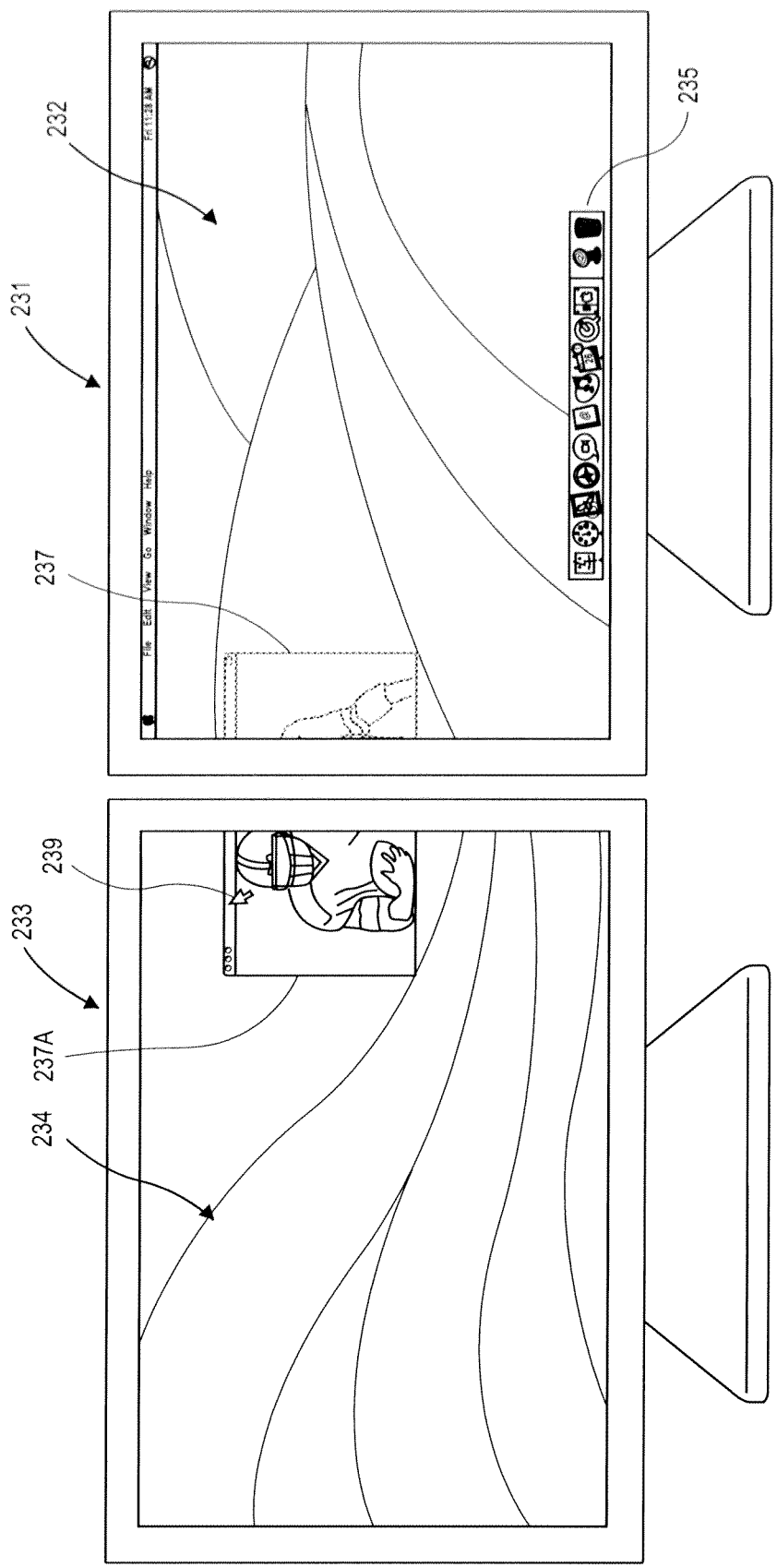

FIGS. 2G, 2H, 2I, and 2J show a more specific example of a graphical user interface provided by two display devices, such as display devices 231 and 233. Display device 231 includes a display region 232 which presents a menu bar at the top of the display region and an application control region 235 at the bottom of the display region 232. A window 237 is shown on display 231. A second display device 233 includes a second display region 234 which does not include a menu bar and which does not include an application control region. It will be appreciated that the two display regions 232 and 234 may display more windows and icons as is known in the art. FIGS. 2G, 2H, 2I and 2J illustrate how the user interface changes as the user drags the window 237 from the display device 231 to the display device 233. In particular, as the user moves the window 237 across to the other display device 233, a portion of the window 237A on the second display device 233 appears differently than the portion of window 237 on display device 231 as shown in FIG. 2H. In this case, the portion 237A is more transparent than the portion 237 on display device 231. If the user stops the move by releasing the mouse's button, for example, then the window 237 is clipped as shown in FIG. 2I. The user can resume the move and drag the window completely over to the display region 234 within the border of the display device 233. FIG. 2J shows the result of the user moving the window 237 back toward display 231 after it has been moved over to the display region 234 on display device 233. The reference point in the case of FIG. 2J is the cursor position 239, and because the reference point has not crossed over to the display device 231, the portion 237A is shown normally while the portion 237 shown in FIG. 2J on display device 231 is shown more transparently than the portion of the window 237A.

Figure 2K:
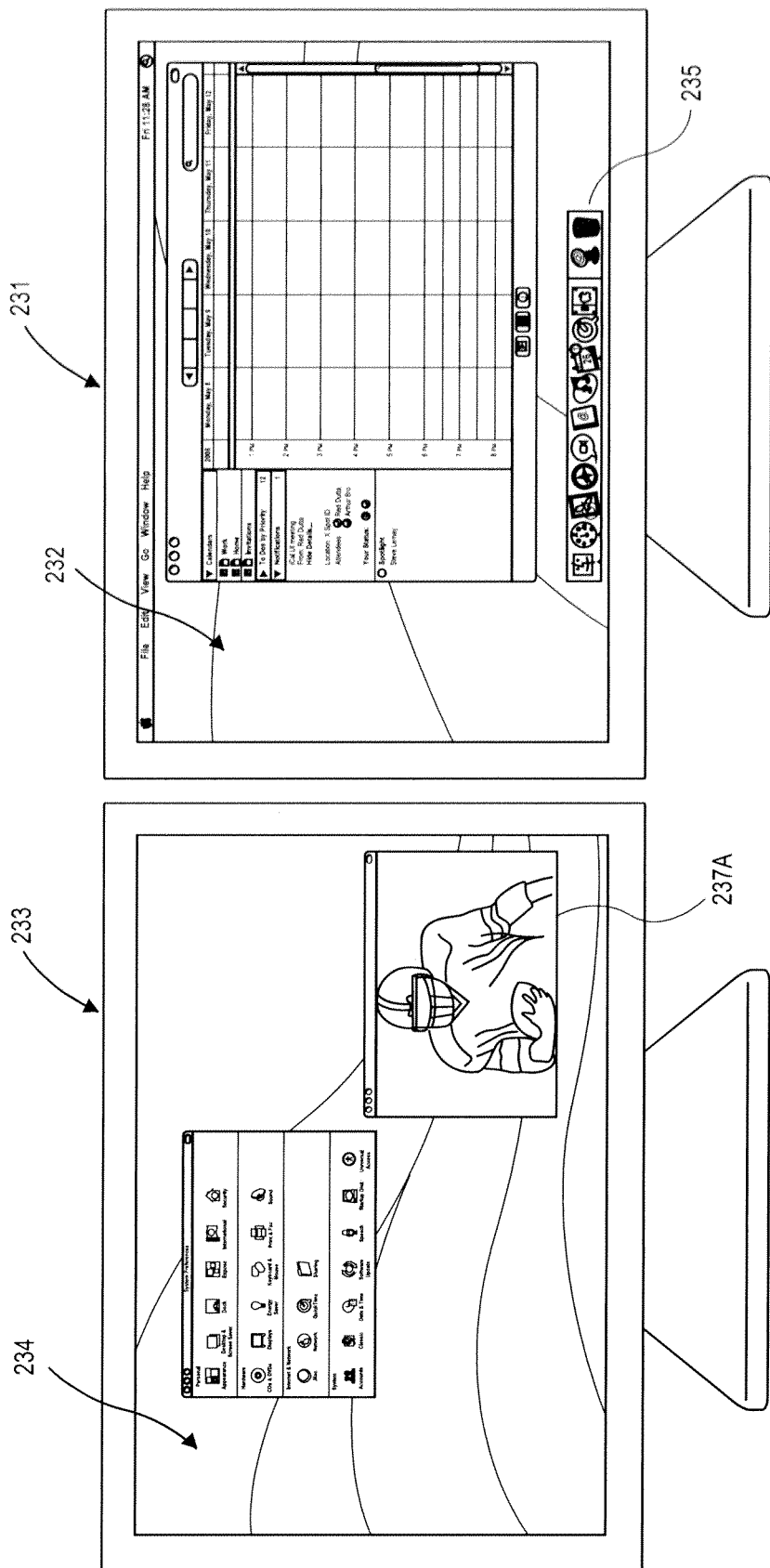
FIGS. 2K and 2L show another example of a graphical user interface in which the appearance of two portions of the window as it straddles two displays are displayed differently.
Figure 2L:
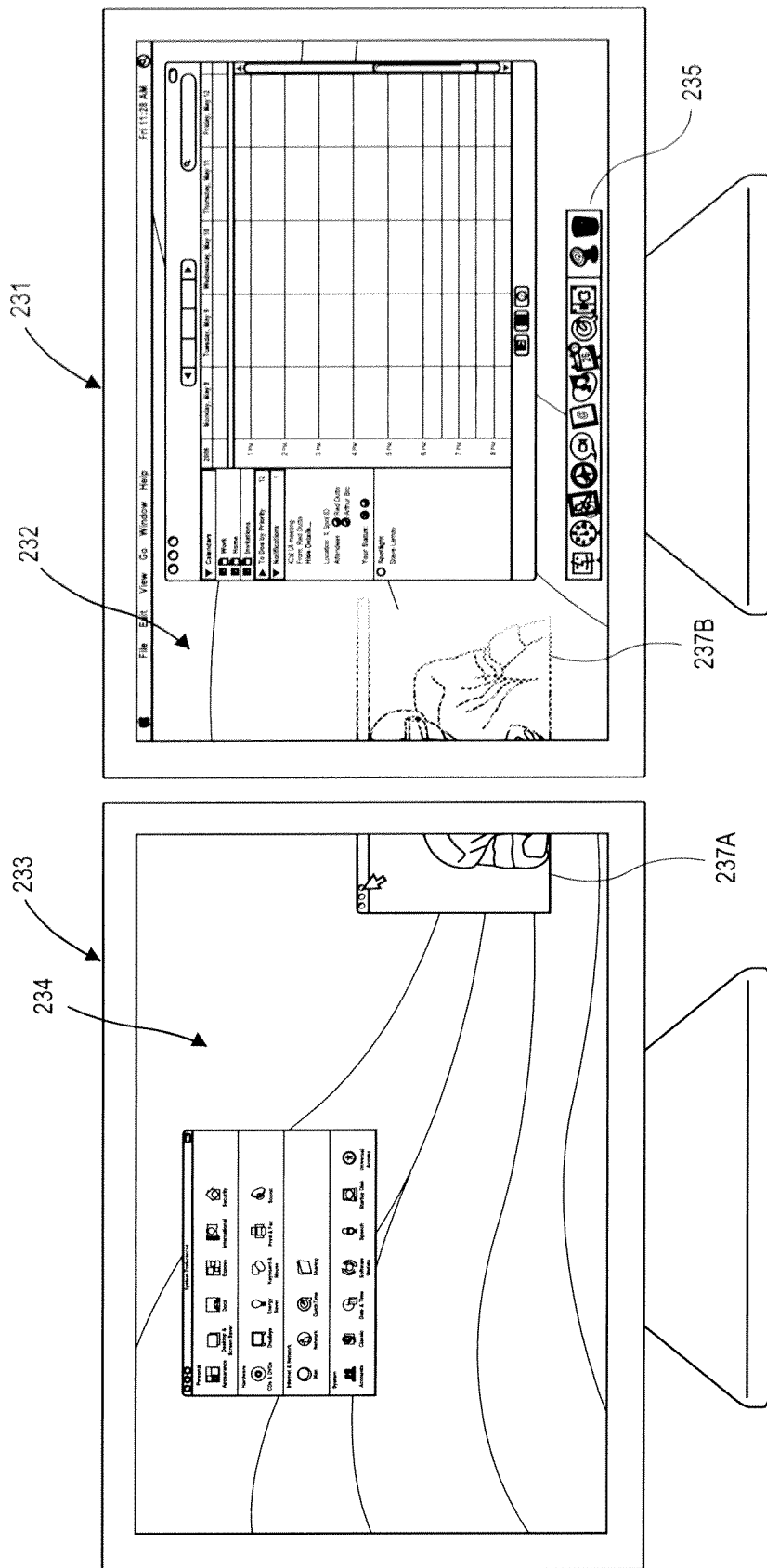

FIGS. 2K and 2L show an alternative embodiment in which there is a transparency gradient as shown in FIG. 2L when the window 237A straddles the two display devices 231 and 233. In particular, the portion 237B of the window becomes increasingly transparent or faded on the display 231 as shown in FIG. 2L.

Figure 3:
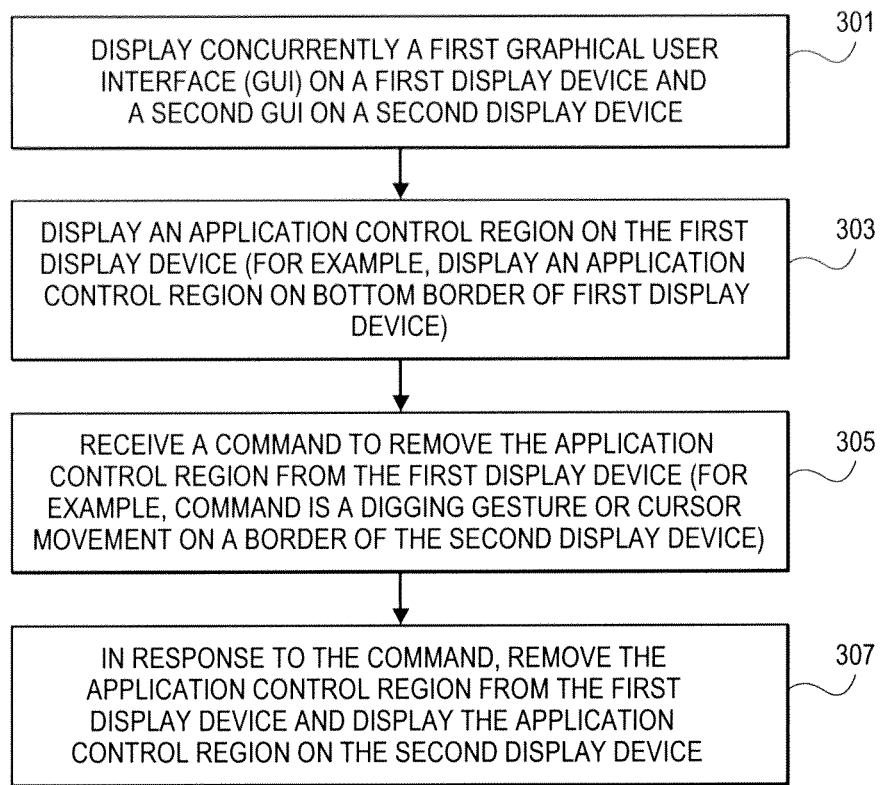
FIG. 3 is a flowchart which illustrates a method according to an embodiment in which an application control region, such as a dock, can be moved between two displays.
Figure 4A:
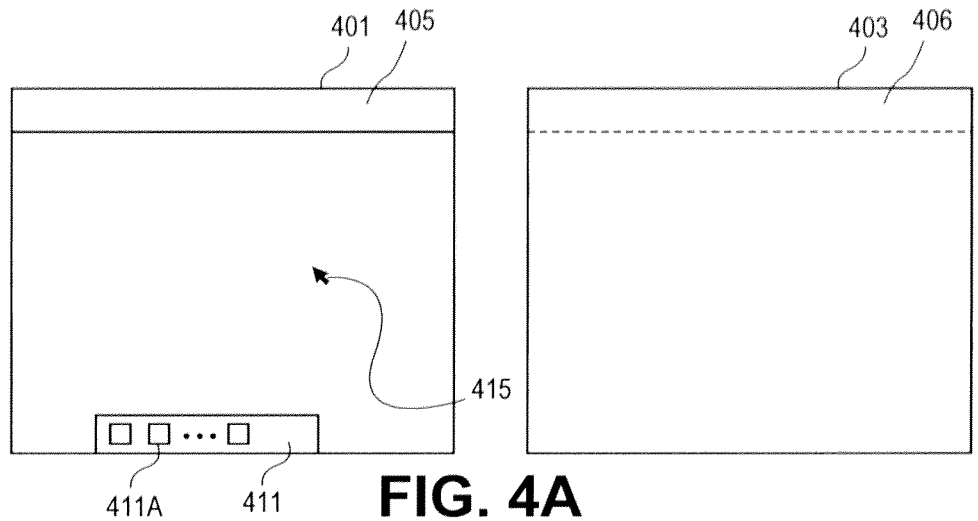
FIGS. 4A, 4B, 4C, and 4D show an example of a user interface which implements the method shown in FIG. 3.
Figure 4B:
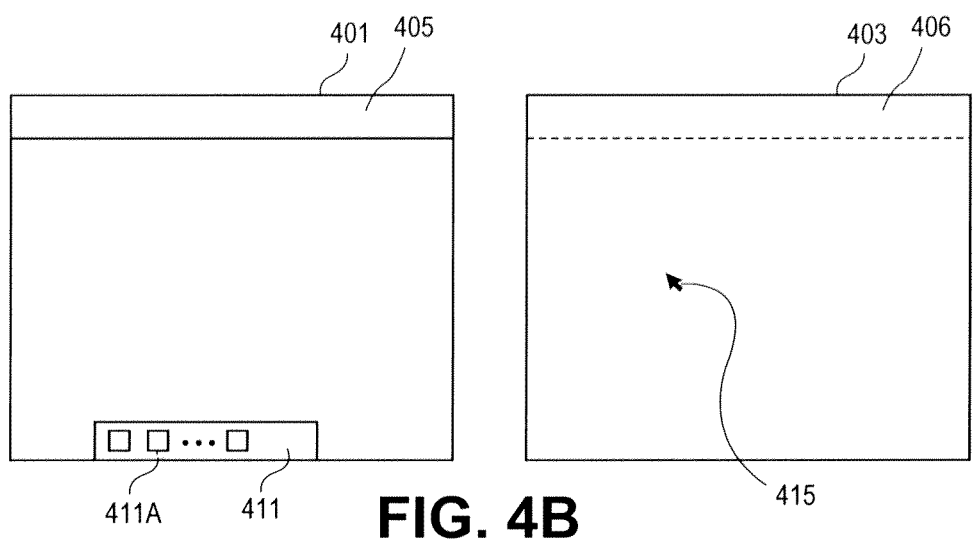
Figure 4C:
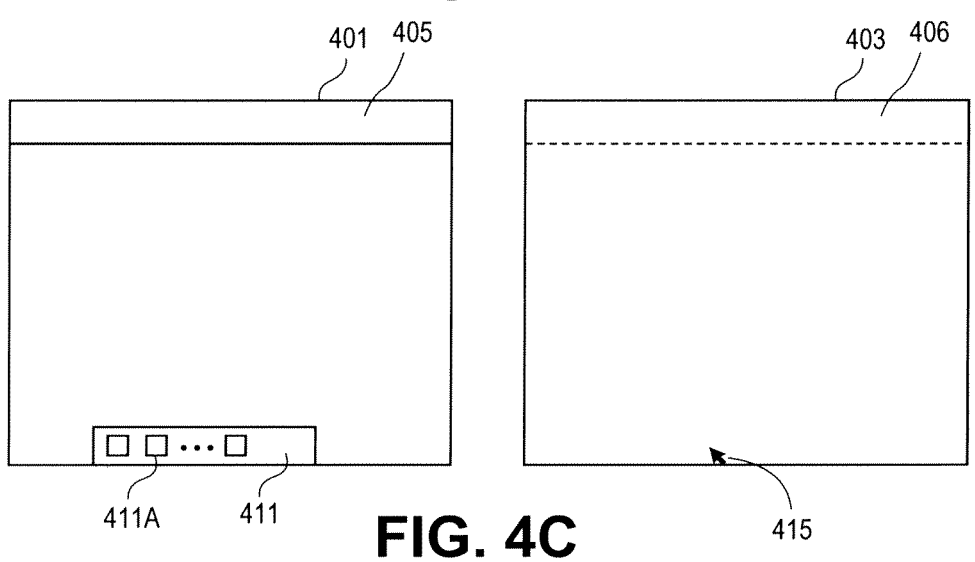
Figure 4D:
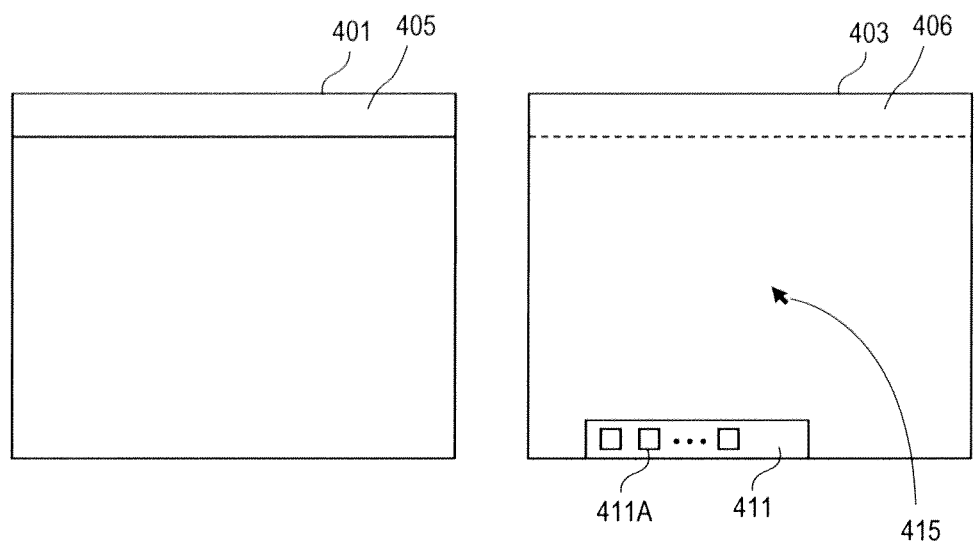

FIG. 3, and FIGS. 4A, 4B, 4C, and 4D illustrate embodiments relating to methods for removing an application control region from one display device and causing the application control region to appear on another display device. In one embodiment, the application control region can resemble the dock found on the Macintosh operating system OS X. The application control region can be used to launch an application or to quit an application and can be used to hold icons which can be used to launch applications or to otherwise control applications, such as word processing applications, spreadsheet applications, presentation applications, web browsing applications, etc. Referring now to FIG. 3, operation 301 can include displaying concurrently a first graphical user interface on a first display device and a second graphical user interface on a second display device. FIG. 4A shows an example of a first display device 401 and a second display device 403 each of which are coupled to the same data processing system in order to concurrently display the first and second graphical user interfaces. These interfaces can include, in the case of display device 401 a menu bar 405, and in the case of the second display device 403 a more translucent menu bar 406 which is more translucent than the menu bar 405. The graphical user interface on display device 401 also includes an application control region 411 which can contain one or more icons of one or more corresponding software applications which can be executed on the data processing system. The application control region 411 is an example of the application control region displayed as a result of operation 303 shown in FIG. 3. A cursor, such as cursor 415, can be controlled by a cursor control device, such as a mouse or trackball or touch input pad or other known cursor control devices. The cursor can also be controlled by touch input in certain embodiments. The cursor 415 can be moved between the two graphical user interfaces on the two display devices, and in particular in FIG. 4B it is shown that the user has moved the cursor 415 onto the second display device 403, and the movement can be continued as shown in FIG. 4C in which the user has positioned the cursor near the bottom of the display device 403. In one embodiment, the user can, through a user setting, specify the location of the application region, such as a bottom border or a left border or a right border of the display device. This setting can establish a predetermined location where the user will need to position the cursor on the display which does not have the application control region in order to move the application control region to that display. In the embodiment shown in FIGS. 4A through 4D, that predetermined location is the bottom border of the display device and hence the cursor 415 has been positioned at the bottom border of display device 403 in order to get the application control region 411 to move from the display device 401 onto display device 403, the result of which can be seen in FIG. 4D. Operation 305 as shown in FIG. 3 receives the command that causes the application control region to be removed from the first display device, and then displayed, as a result of operation 307, on the second display device.

In one embodiment, the command received in operation 305 can be the positioning of a cursor near a border of the second display region which does not include the application control region. The border on the second display region can be a predetermined border (e.g. bottom border set by a user setting). The command can require that the positioning of the cursor be near the predetermined location for an extended period of time in one embodiment. In another embodiment, the command can be a touch gesture or a cursor gesture in the predetermined border (e.g. the bottom border as in the embodiment shown in FIGS. 4A through 4D). In another embodiment, the command can be an activation or click of one or more buttons of the cursor control device near a predetermined display location, such as a bottom border of the display device. In another embodiment, the command can include receiving an input, such as an input from a cursor control device that includes or indicates a movement of the cursor towards and beyond a border of the display device which does not display the application control region; in one embodiment, the movement of the cursor towards and beyond the border is a movement towards a predetermined border such as the bottom border in the case of the embodiment shown in FIGS. 4A through 4D. FIGS. 4B and 4C show how the user has moved the cursor towards the bottom border and the cursor 415 will remain at the bottom border as the user moves, in one embodiment, the cursor control device beyond the bottom border of display device 403. For example, the user can use a mouse as the cursor control device to move the cursor 415 down towards the bottom border and once the cursor 415 hits the bottom border the user continues to move the mouse down which indicates the movement of the cursor beyond the border of the second display device 403. The result of this command causes the application control region 411 to be removed from the display device 401 and to be displayed on the display device 403. The user can then use the application control region to control applications by selecting icons, such as icon 411A within the application control region 411 on the display device 403. The above configurations or actions triggering moving application control region 411 can be utilized individually or in combination, which may be user configurable.

Another aspect of the embodiments described herein relates to how a menu bar can be displayed on the second or other display devices. FIGS. 5, 6A, 6B, 6C, and 6D show an embodiment in which the same menu bar is displayed on two different display devices, and in particular how the two menu bars are displayed differently depending upon cursor focus. The embodiment described relative to FIG. 7 shows an example of how different menu bars for different application programs can be displayed differently on different displays depending upon cursor focus and depending upon the foreground application on each display device.

Figure 6A:
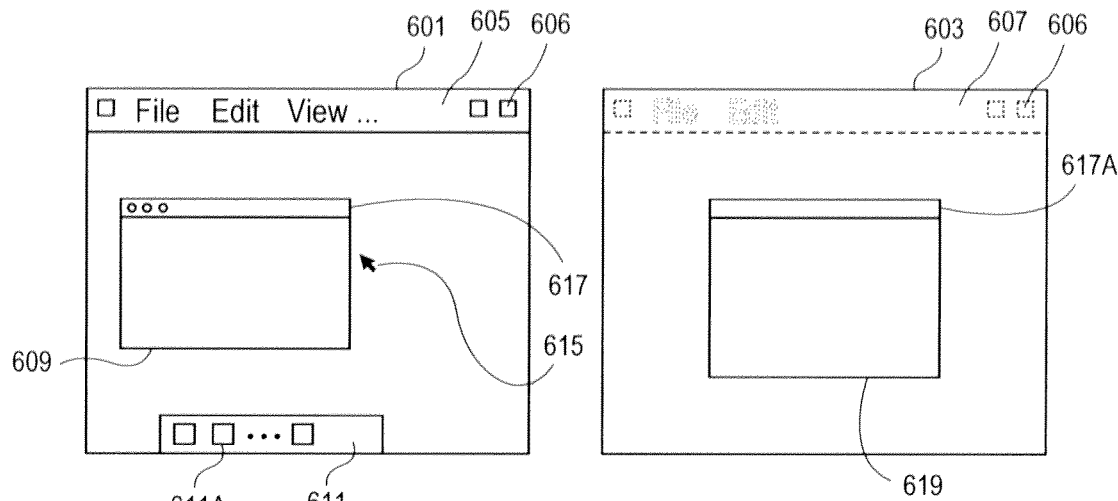
FIGS. 6A, 6B, 6C, and 6D show an example of a user interface which can use the method shown in FIG. 5.
Figure 6B:
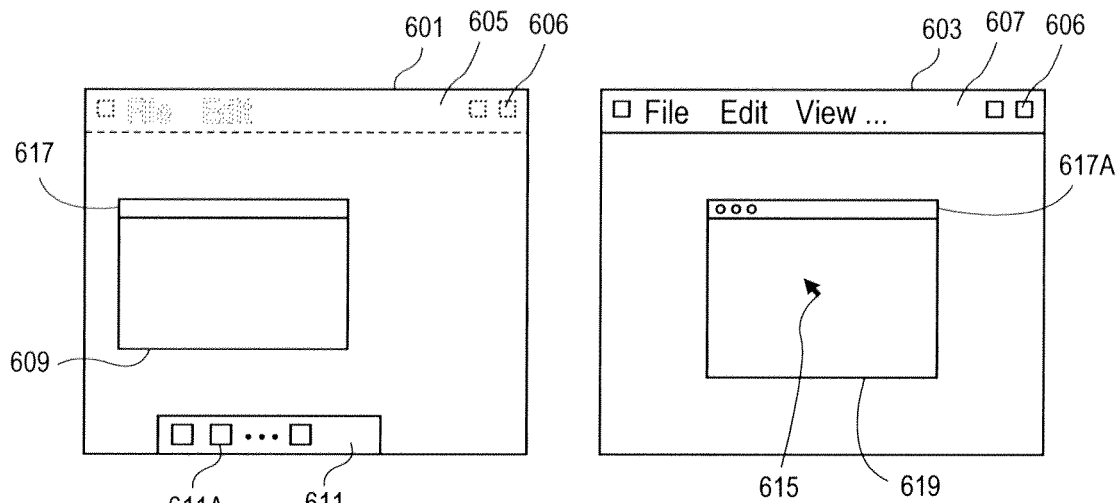
Figure 6C:
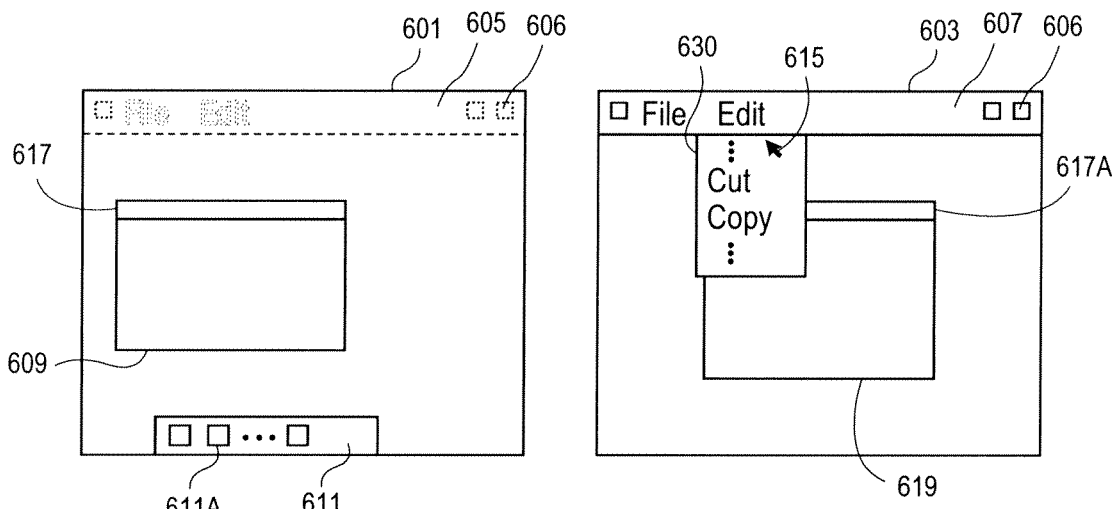
Figure 6D:
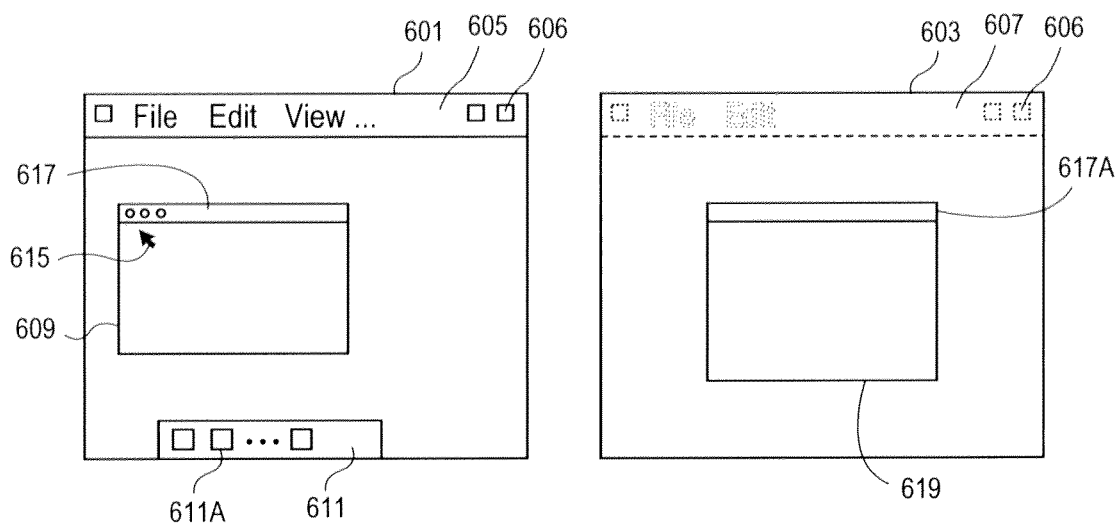
Figure 7:
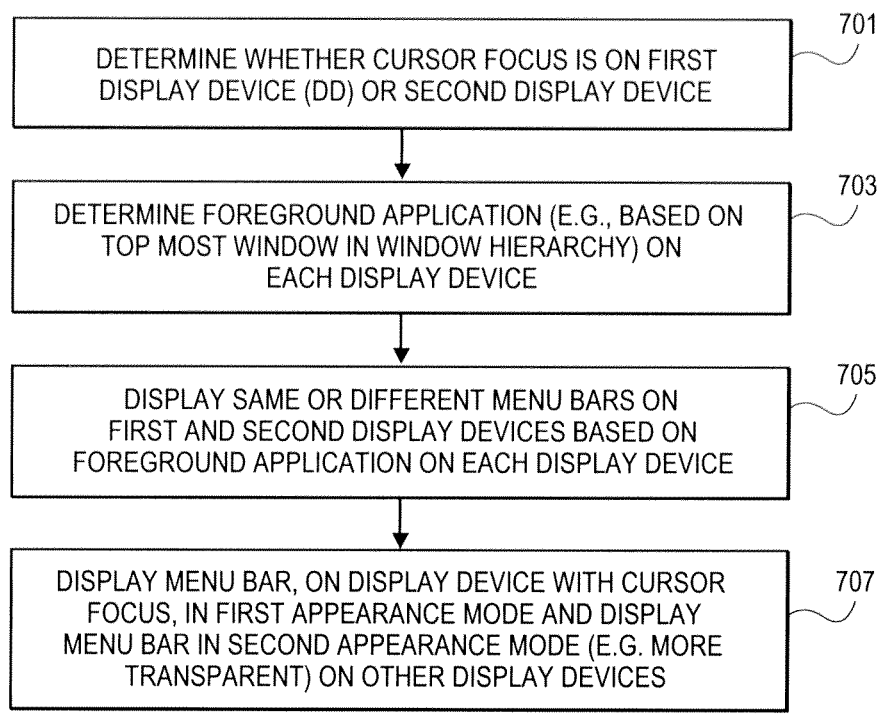
FIG. 7 shows a flowchart which illustrates another method in which the same or different menu bars can be displayed on two or more display devices.

Referring to FIGS. 6A through 6D, a menu bar 605 is displayed along the top border of the display device 601. The menu bar 605 can be for the foreground application which presents the window 609 on display device 601. The user interface shown within the display device 601 also includes an application control region 611 which includes one or more icons, such as icon 611A, for controlling one or more application programs. The application which presents window 609 can also present another window 619 on the other display device 603 which is a second display device which displays a different version of menu bar 605 which is for the same program that is controlling window 609. Thus, the same application program displays its menu bar on the two different displays, but those menu bars are displayed differently on the two different displays. In one embodiment, menu bar 605 is displayed normally while the menu bar 607 is displayed more transparently than the menu bar 605. The user can see the same set of options (such as "file", "edit", "view", etc.) on each menu bar but the menu bar 607 is more transparent, in one embodiment than the menu bar 605. This means that the background image on the desktop displayed on display device 603 will appear through the menu bar 607. Each of the menu bars 605 and 607 include, in addition to the selectable options within the menu bar, one or more status indicators and system controls or system commands 606, such as a search command or the time of day, etc. In one embodiment, the menu bar can present options which can be selected in the menu bar, such as the option "file" or the option "edit" or the option "view", and the selection of those options causes the presentation of selectable commands in a menu associated with the menu bar. FIG. 6C shows an example of the menu 630, which is a form of a pull down menu or drop down menu which is associated with menu bar 607 by virtue of being attached to the menu bar 607. The menu 630 includes selectable commands within the menu 630. Each application which is the foreground application can have its own menu bar displayed, and in the embodiment shown in FIGS. 6A through 6D the same menu bar is displayed on both display devices as the same application is the foreground application on both display devices. In the case of the example shown in FIG. 6B, the user has moved the cursor 615 from the first display device 601 onto the second display device 603 and has positioned the cursor 615 within the window 619. This has caused a change in cursor focus, resulting in the menu bar 607 presenting the menu bar of the application in a normal appearance mode while the menu bar 605 shown in FIG. 6B is displayed differently, and in this case more transparently than the menu bar 607. The change in cursor focus can occur by a variety of different techniques including, for example, merely positioning the cursor on the other display device or by positioning the cursor on the other display device and then by activating a switch, such as a mouse's button or a key on a keyboard, etc. while the cursor is positioned on the other display device. FIG. 6C shows another example in which cursor focus can change by the user's selection of the "edit" option in menu bar 607. FIG. 6D shows the example in which the user has moved the cursor back into window 609 in order to interact with that window thereby causing the cursor focus to change from that shown in FIGS. 6B and 6C.

Figure 5:
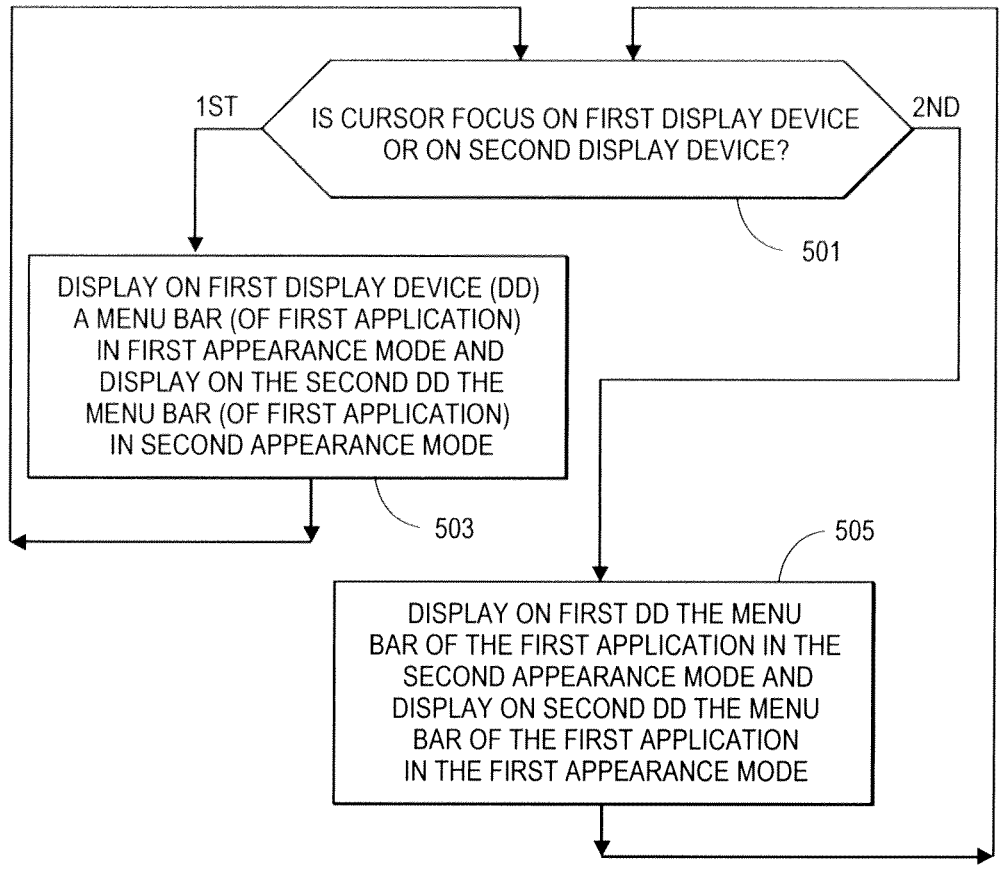
FIG. 5 is a flowchart which shows a method according to one embodiment in which menu bars on two displays are displayed differently depending, in this embodiment, on which display has the cursor focus.

FIG. 5 illustrates a method which can be employed by a data processing system to achieve the various graphical user interfaces shown in FIG. 6A through 6D. In operation 501, the data processing system can determine whether cursor focus is on the first display device or on the second display device. In response to determining that the cursor focus is on the first display device, the data processing system displays in operation 503 the menu bar of the first application program in a first appearance mode and displays on the second display device the menu bar of the same application program in a second appearance mode. FIGS. 6A and 6D show examples of the result of operation 503. If operation 501 determines that the cursor focus is on the second display device, then operation 505 follows in which the menu bar of the first application is displayed on the first display device in the second appearance mode and the menu bar of the first application is displayed on the second display device in the first appearance mode; an example of the graphical user interface resulting from operation 505 is shown in FIGS. 68 and 6C.

In the embodiments shown in FIGS. 6A through 6D, the application control region, which can be the dock, remains fixed on the first display device 601 despite changes in cursor focus in one embodiment; in another embodiment, the dock or application control region 611 can move with changes in cursor focus. It will also be appreciated that, in other embodiments, the dock 611 can be moved by invoking the method of FIG. 3 such that the application control region can be moved but requires more than a mere change in cursor focus in order to cause it to move.

FIG. 7 shows an example of how different display devices can have different menu bars for different application programs but can display those different menu bars differently with different appearances. For example, one menu bar for one application can be displayed normally on a first display while another menu bar of another application displayed on a second display can be displayed more transparently than the menu bar on the first display device. The method can begin in operation 701 in which the data processing system determines whether cursor focus is on the first display device or on the second display device. In operation 703, the data processing system determines the foreground application on each display device; in one embodiment, this can be based upon the top most window in the window hierarchy on each display device. Based upon the determinations made in operations 701 and 703, the data processing system can display the same or different menu bars on each of the first and second display devices based upon which foreground application exists on each display device. In operation 707 the data processing system can display the menu bars differently depending upon cursor focus. For example, if the cursor focus is on the first display, then the menu bar on the first display will be displayed with a normal appearance mode while the menu bar on the other display will be displayed with a different appearance mode, such as a mode in which that menu bar is more transparent than that menu bar on the display device with cursor focus. While the method of FIG. 7 has been shown relative to a system that drives concurrently two display devices, it will be appreciated that the method can be extended to a data processing system which has more than two display devices. The method of FIG. 7 can be used in conjunction with an application control region which remains fixed on a border of one of the display devices despite changes in cursor focus but which can be removed from one display and moved onto another display by using a method such as that shown in FIG. 3. Moreover, the method shown in FIG. 7 can be combined with an embodiment that uses the methods of FIGS. 1A and 1B when a window straddles across the two or more displays used in an embodiment of FIG. 7. It will be appreciated that the foreground application is typically the application that controls or presents information in the top most window and is also the application which has the keyboard focus, meaning that a key input is directed to that application rather than other applications in background windows.

Figure 8:
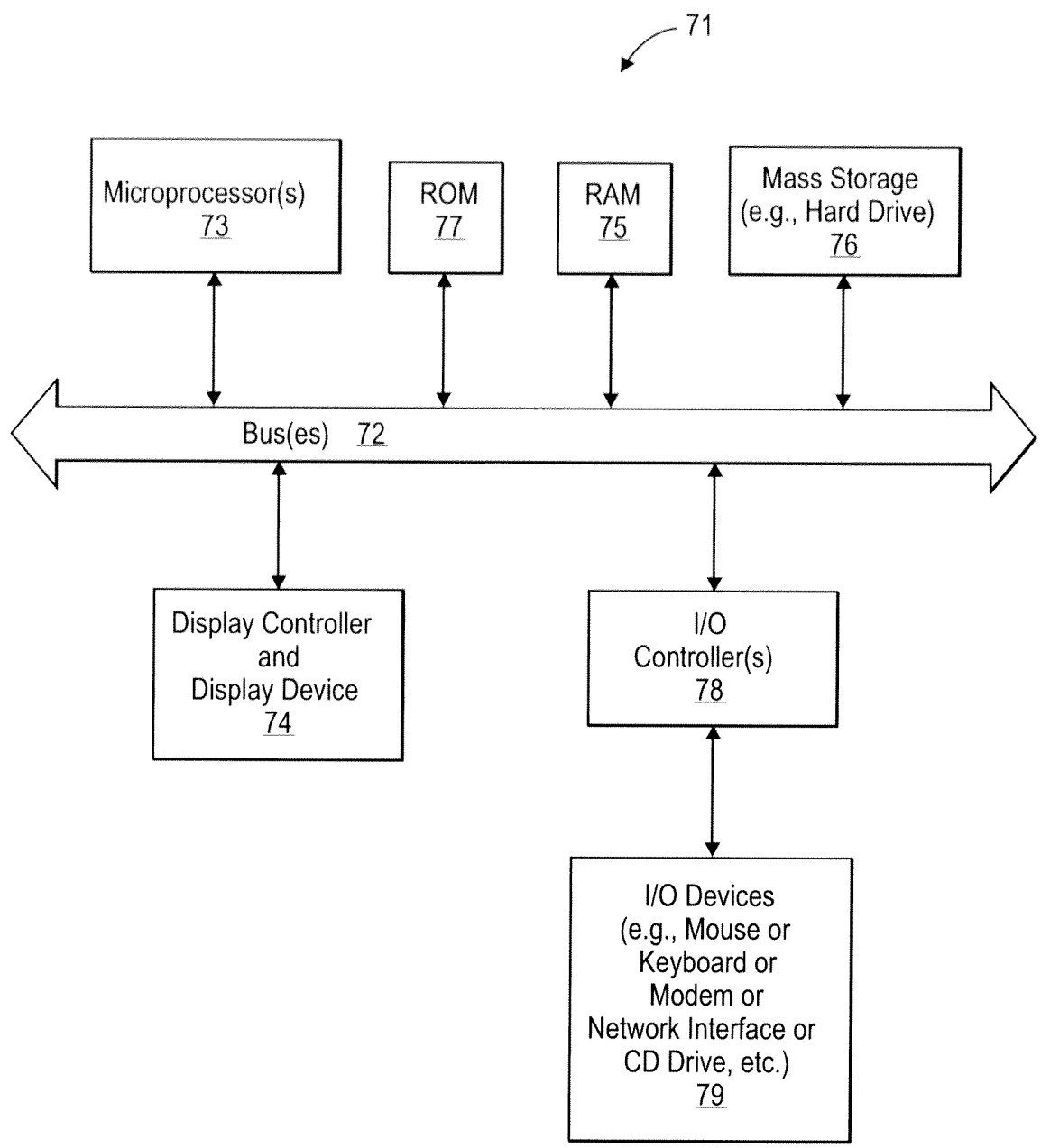
FIG. 8 shows an example of a data processing system which can be used to implement any one of the embodiments described herein.

FIG. 8 shows one example of a typical computer system which may be used with the present invention. Note that while FIG. 8 illustrates various components of a computer system, it is not intended to represent any particular architecture or manner of interconnecting the components as such details are not germane to the present invention. It will also be appreciated that network computers, handheld computers, cellular telephones, entertainment systems, other data processing systems or consumer electronic devices which have fewer components or perhaps more components may also be used with the present invention or may implement one or more embodiments described herein. The computer system of FIG. 8 may, for example, be a Macintosh computer from Apple Inc.

As shown in FIG. 8, the computer system, 71, which is a form of a data processing system, includes a bus 72 which is coupled to a microprocessor(s) 73 and a ROM (Read Only Memory) 77 and volatile RAM 75 and a non-volatile memory 76. The microprocessor 73 may be one or more microprocessors from Intel. The bus 72 interconnects these various components together and also interconnects these components 73, 77, 75, and 76 to one or more display controllers and a plurality of display devices 74 and to peripheral devices such as input/output (I/O) devices which may be a touch input panel, mice, keyboards, modems, network interfaces, printers and other devices which are well known in the art. Typically, the input/output devices 79 are coupled to the system through input/output controllers 78. The volatile RAM (Random Access Memory) 75 is typically implemented as dynamic RAM (DRAM) which requires power continually in order to refresh or maintain the data in the memory. The mass storage 76 is typically a magnetic hard drive or a magnetic optical drive or an optical drive or a DVD RAM or other types of memory systems which maintain data (e.g. large amounts of data) even after power is removed from the system. Typically, the mass storage 76 will also be a random access memory although this is not required. While FIG. 8 shows that the mass storage 76 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 72 may include one or more buses connected to each other through various bridges, controllers and/or adapters as is well known in the art. In one embodiment the I/O controller 78 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its one or more processors, such as a microprocessor, executing sequences of instructions contained in a non-transitory machine readable memory, such as ROM 77, RAM 75, mass storage 76 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 73.

FIG. 8 shows an embodiment in which multiple displays are driven by the same data processing system. For example, a desktop computer can have two or more display devices connected to it and driven by it. Users will often implement such a system in order to provide a greater display space which in turn means the user can often display more windows on the combined displays. Thus, the system in FIG. 8 can support any one of the multiple display embodiments described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method comprising:
   at an electronic device with one or more processors, non-transitory memory, and one or more input devices, that is in communication with a first display device and a second display device:
   concurrently displaying a first system interface element that includes one or more status indicators in a first appearance mode on the first display device and a second system interface element that includes the one or more status indicators in a second appearance mode different from the first appearance mode on the second display device, wherein the first appearance mode is associated with a first translucency value, and wherein the second appearance mode is associated with a second translucency value that corresponds to a greater translucency than the first translucency value;
   while concurrently displaying the first system interface element in the first appearance mode on the first display device and the second system interface element in the second appearance mode on the second display device, detecting an input directed to a respective display device; and
   in response to detecting the input:
   in accordance with a determination that respective display device corresponds to the first display device, maintaining display of the first system interface element in the first appearance mode on the first display device and the second system interface element in the second appearance mode on the second display device; and
   in accordance with a determination that respective display device corresponds to the second display device, concurrently displaying the first system interface element in the second appearance mode on the first display device and the second system interface element in the first appearance mode on the second display device.

2. The method of claim 1, wherein the one or more status indicators includes at least one of a search command or a time of day.

3. The method of claim 1, further comprising:
   displaying a first window for a first application in a foreground state on the first display device, wherein the first and second system interface elements are associated with the first application, and wherein the first and second system interface elements also include a plurality of selectable options associated with the first application.

4. The method of claim 3, wherein the first and second system interface elements include a same plurality of selectable options associated with the first application.

5. The method of claim 3, wherein the first system interface element associated with the first application in the first appearance mode includes a first plurality of selectable options associated with the first application, and wherein the second system interface element associated with the first application in the second appearance mode includes a second plurality of selectable options associated with the first application different from the first plurality of selectable options.

6. The method of claim 3, further comprising:
   while displaying the first window for the first application in the foreground state on the first display device, displaying a second window for a second application in a background state on the first display device;
   detecting a second input directed to the second window for the second application; and
   in response to detecting the second input:
   changing the second window for the second application to the foreground state and the first window for the first application to the background state; and
   displaying a third system interface element that includes one or more status indicators in the first appearance mode on the first display device and a fourth system interface element that includes the one or more status indicators in the second appearance mode different from the first appearance mode on the second display device.

7. The method of claim 6, wherein the third and fourth system interface elements are associated with the second application, and wherein the third and fourth system interface elements include a plurality of selectable options associated with the second application.

8. The method of claim 3, further comprising:
   while displaying the first window for the first application in the foreground state on the first display device, displaying a second window for a second application in a background state on the second display device;
   detecting a second input directed to the second window for the second application; and
   in response to detecting the second input:
   changing the second window for the second application to the foreground state and the first window for the first application to the background state; and displaying a third system interface element that includes one or more status indicators in the first appearance mode on the second display device and a fourth system interface element that includes the one or more status indicators in the second appearance mode different from the first appearance mode on the first display device.

9. The method of claim 8, wherein the third and fourth system interface elements are associated with the second application, and wherein the third and fourth system interface elements include a plurality of selectable options associated with the second application.

10. The method of claim 3, wherein the input corresponds to movement of the first window from the first display device to the second display device.

11. The method of claim 1, wherein the input corresponds to movement of a cursor to an edge of the respective display device for at least a predetermined duration.

12. The method of claim 1, wherein the input corresponds to movement of a cursor to and beyond an edge of the respective display device.

13. The method of claim 1, wherein the input corresponds to a touch input detected within a threshold distance of an edge of the respective display device.

14. The method of claim 1, wherein the first and second system interface elements correspond to menu bars.

15. The method of claim 1, wherein the first system interface element is located adjacent to a top edge of the first display device and the second system interface element is located adjacent to a top edge of the second display device.

16. A non-transitory computer-readable storage medium storing executable program instructions, which, when executed by a data processing system with one or more input devices, a first display device, and a second display device, cause the data processing system to:
concurrently display a first system interface element that includes one or more status indicators in a first appearance mode on the first display device and a second system interface element that includes the one or more status indicators in a second appearance mode different from the first appearance mode on the second display device, wherein the first appearance mode is associated with a first translucency value, and wherein the second appearance mode is associated with a second translucency value that corresponds to a greater translucency than the first translucency value;
while concurrently displaying the first system interface element in the first appearance mode on the first display device and the second system interface element in the second appearance mode on the second display device, detect an input directed to a respective display device; and
in response to detecting the input:
in accordance with a determination that respective display device corresponds to the first display device, maintain display of the first system interface element in the first appearance mode on the first display device and the second system interface element in the second appearance mode on the second display device; and
in accordance with a determination that respective display device corresponds to the second display device, concurrently display the first system interface element in the second appearance mode on the first display device and the second system interface element in the first appearance mode on the second display device.

17. The non-transitory computer-readable storage medium of claim 16, wherein the one or more status indicators includes at least one of a search command or a time of day.

18. The non-transitory computer-readable storage medium of claim 16, wherein the executable program instructions further cause the data processing system to:
display a first window for a first application in a foreground state on the first display device, wherein the first and second system interface elements are associated with the first application, and wherein the first and second system interface elements also include a plurality of selectable options associated with the first application.

19. The non-transitory computer-readable storage medium of claim 18, wherein the input corresponds to movement of the first window from the first display device to the second display device.

20. The non-transitory computer-readable storage medium of claim 16, wherein the first and second system interface elements correspond to menu bars.

21. The non-transitory computer-readable storage medium of claim 16, wherein the first system interface element is located adjacent to a top edge of the first display device and the second system interface element is located adjacent to a top edge of the second display device.

22. An electronic device, comprising:
one or more input devices;
a first display device;
a second display device;
one or more processors; and
non-transitory memory storing executable program instructions, which, when executed by the one or more processors, cause the electronic device to:
concurrently display a first system interface element that includes one or more status indicators in a first appearance mode on the first display device and a second system interface element that includes the one or more status indicators in a second appearance mode different from the first appearance mode on the second display device, wherein the first appearance mode is associated with a first translucency value, and wherein the second appearance mode is associated with a second translucency value that corresponds to a greater translucency than the first translucency value;
while concurrently displaying the first system interface element in the first appearance mode on the first display device and the second system interface element in the second appearance mode on the second display device, detect an input directed to a respective display device; and
in response to detecting the input:
in accordance with a determination that respective display device corresponds to the first display device, maintain display of the first system interface element in the first appearance mode on the first display device and the second system interface element in the second appearance mode on the second display device; and
in accordance with a determination that respective display device corresponds to the second display device, concurrently display the first system interface element in the second appearance mode on the first display device and the second system interface element in the first appearance mode on the second display device.

23. The electronic device of claim 22, wherein the one or more status indicators includes at least one of a search command or a time of day.

24. The electronic device of claim 22, wherein the executable program instructions further cause the electronic device to:
- display a first window for a first application in a foreground state on the first display device, wherein the first and second system interface elements are associated with the first application, and wherein the first and second system interface elements also include a plurality of selectable options associated with the first application.

25. The electronic device of claim 24, wherein the input corresponds to movement of the first window from the first display device to the second display device.

26. The electronic device of claim 22, wherein the first and second system interface elements correspond to menu bars.

27. The electronic device of claim 22, wherein the first system interface element is located adjacent to a top edge of the first display device and the second system interface element is located adjacent to a top edge of the second display device.

* * * * *